United States Patent
Berhan (10) Patent No.: US 9,644,735 B2
(45) Date of Patent: May 9, 2017

(54) POWERTRAIN CONTROL BASED ON BEARING SPEED

(71) Applicant: Ford Global Technologies, LLC, Dearborn, MI (US)

(72) Inventor: Michael Tekletsion Berhan, Sylvania, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 276 days.

(21) Appl. No.: 14/551,342

(22) Filed: Nov. 24, 2014

(65) Prior Publication Data
US 2016/0146339 A1    May 26, 2016

(51) Int. Cl.
*F16H 61/04* (2006.01)
*F16D 48/06* (2006.01)
*F16H 61/12* (2010.01)

(52) U.S. Cl.
CPC ......... *F16H 61/0437* (2013.01); *F16D 48/06* (2013.01); *F16H 61/12* (2013.01); *F16D 2300/18* (2013.01); *F16D 2500/50287* (2013.01); *F16H 2061/0462* (2013.01)

(58) Field of Classification Search
CPC ......... F16H 61/0437; F16H 2061/0462; F16H 61/04; F16D 2500/50287; F16D 2500/3081; F16D 2300/18
See application file for complete search history.

(56) References Cited

U.S. PATENT DOCUMENTS

| | | |
|---|---|---|
| 3,952,566 A | 4/1976 | Jacobson |
| 4,196,629 A | 4/1980 | Philips |
| 5,293,787 A | 3/1994 | Paul et al. |
| 5,566,092 A | 10/1996 | Wang |
| 6,100,809 A * | 8/2000 | Novoselsky ............ F16C 19/52 340/648 |
| 6,321,602 B1 | 11/2001 | Ben-Romdhane |
| 6,526,831 B2 | 3/2003 | Ben-Romdhane |
| 6,802,221 B2 | 10/2004 | Hedeen et al. |
| 7,142,990 B2 | 11/2006 | Bouse et al. |
| 7,389,701 B2 | 6/2008 | Mol |
| 7,444,888 B2 | 11/2008 | Mol |
| 7,448,854 B2 | 11/2008 | Jolly et al. |
| 7,722,322 B2 | 5/2010 | Altieri et al. |
| 7,843,192 B2 | 11/2010 | Galeote |
| 7,930,949 B2 | 4/2011 | Singh |
| 7,942,633 B2 | 5/2011 | Jolly et al. |

(Continued)

FOREIGN PATENT DOCUMENTS

| | | |
|---|---|---|
| EP | 2118525 A1 | 11/2009 |
| JP | 2011174571 A | 9/2011 |

(Continued)

*Primary Examiner* — Huan Le
(74) *Attorney, Agent, or Firm* — James Dottavio; Brooks Kushman P.C.

(57) ABSTRACT

A speed sensor is integrated with a bearing of a transmission. The speed sensor may sense rotation of a bearing cage using a proximity sensor or may sense passage of the rolling elements themselves using an acceleration sensor. The speed of the shaft supported by the bearing is calculated from the speed sensor reading. The shaft speed may be used to control a slipping clutch during a shift event. When the transmission is in a fixed gear ratio, inconsistent speed sensor reading may indicate a preload issue.

19 Claims, 5 Drawing Sheets

(56) References Cited

U.S. PATENT DOCUMENTS

| | | |
|---|---|---|
| 8,082,115 B2 | 12/2011 | Bechhoefer et al. |
| 8,313,296 B2 | 11/2012 | Jolly et al. |
| 8,442,778 B2 | 5/2013 | Bechhoefer et al. |
| 8,480,364 B2 | 7/2013 | Altieri et al. |
| 2007/0014498 A1* | 1/2007 | Aoki .................... F16C 19/186 384/448 |
| 2008/0152272 A1 | 6/2008 | Debrailly et al. |
| 2011/0142621 A1* | 6/2011 | D ......................... F03D 7/0292 416/1 |
| 2012/0146629 A1* | 6/2012 | Mulcaster .............. G01D 5/145 324/207.25 |
| 2014/0157880 A1* | 6/2014 | Matsuda ............... F16C 41/008 73/112.01 |
| 2014/0298917 A1* | 10/2014 | Nivet ....................... G01L 1/16 73/785 |

FOREIGN PATENT DOCUMENTS

| | | | |
|---|---|---|---|
| KR | 20110133184 A | | 12/2011 |
| WO | 2008110472 A1 | | 9/2008 |
| WO | 2009046706 A3 | | 7/2009 |

\* cited by examiner

POWERTRAIN CONTROL BASED ON BEARING SPEED

TECHNICAL FIELD

This disclosure relates to the field of vehicle controls. More particularly, the disclosure pertains to control of a transmission system based on speed measurements of bearing elements such as rollers, balls, or cages.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

In many automatic transmissions, the power flow paths associated with various speed ratios are established by engaging a subset of the available clutches and brakes. Typically, the clutches and brakes are engaged by providing fluid at a controlled pressure to a clutch apply chamber. The fluid pressure forces a piston which in turn compressed a clutch pack of alternating friction plates and separator plates. A controller typically regulates the fluid pressure by adjusting the magnitude of an electric current to a solenoid which regulates a force on a valve to adjust the pressure. To switch from one ratio to another ratio, one clutch or brake is released and another clutch or brake is engaged. Some shifts require release of multiple clutches and engagement of multiple clutches.

Making a smooth shift between ratios requires that release of the off-going clutch and engagement of the on-coming clutch be gradual and carefully coordinated. The relationship between the current supplied to the solenoid and the clutch torque capacity is subject to many noise factors. Therefore, accurate control of the clutches requires use of a feedback signal.

SUMMARY OF THE DISCLOSURE

A vehicle includes a shaft supported within a housing by a bearing with rolling elements, a controller, and a sensor mounted to the housing and configured to transmit a signal to the controller in response to translation of the rolling elements. The rolling elements may be retained within a cage. The sensor may be a proximity sensor such as a Hall effect sensor that produces an electrical voltage that varies depending upon whether the sensor is adjacent to a tooth or a gap on the cage. Alternatively, the sensor may be an acceleration sensor that responds to passage of the rolling elements past a fixed point on the housing. The sensed speed may be used to control the torque capacity of a transmission clutch. When the transmission is not shifting, the sensor reading may indicate a pre-load issue with the bearing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
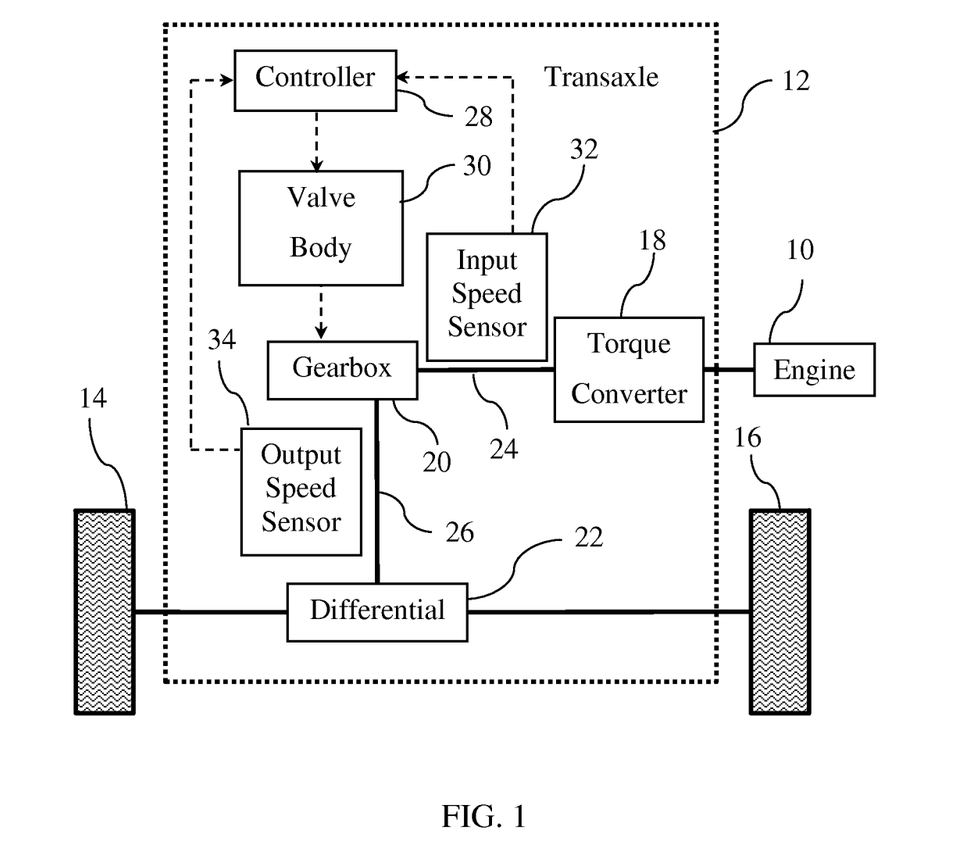
FIG. 1 is a schematic illustration of a vehicle powertrain.

FIG. 1 schematically illustrates a front wheel drive vehicle powertrain. The heavy lines indicate the flow of mechanical power, whereas the dashed lines indicate the flow of information. An internal combustion engine 10 generates mechanical power by converting stored chemical energy in a fuel source. Transaxle 12 adapts the speed and torque of the mechanical power produced by the engine to suit the current needs of the vehicle. Mechanical power from transaxle 12 is routed to left and right wheels 14 and 16.

Within the transaxle, power is transmitted by a torque converter 18, a gearbox 20, and a differential 22. Gearbox 20 provides the main variable ratio gearing. Torque converter 18 facilitates vehicle launch from zero speed by transmitting torque when the vehicle is not moving. Torque converter 18 includes an impeller driven by engine 10 and a turbine connected to an input of gearbox 20 by a turbine shaft 24. Torque converter 18 may also include a lock-up clutch to improve efficiency after vehicle launch. Differential 22 provides roughly equal torque to each wheel while accommodating slight differences in speed such as when the vehicle turns a corner. Power may be transferred from gearbox 20 to differential 22 via gearing 26 that multiplies torque by a fixed final drive ratio. In a rear wheel drive vehicle layout, the differential is typically a separate unit separated from the transmission by a driveshaft. The differential of a rear wheel drive vehicle also changes the axis of rotation by roughly 90 degrees and adjusts the speed and torque by a fixed final drive ratio.

The transaxle 12 includes a controller 28 which sends electrical signals to a valve body 30. In response to these electrical signals, the valve body 30 controls pressures in fluid passages to clutch apply chambers within gearbox 20 to select and shift among gear ratios. Controller 28 relies on signals from sensors to help determine how much pressure to command. Among these sensors are an input speed sensor 32 configured to measure the speed of turbine shaft 24 and an output speed sensor 34 configured to measure the speed of a shaft in the final drive gearing 26. Additional speed sensors may indicate the speeds of shafts within gearbox 20.

An upshift is performed in two stages: a torque transfer stage and an inertia phase. During the torque transfer phase, the torque capacity of the off-going clutch is gradually reduced and the torque capacity of the on-coming clutch is gradually increased. The speeds of the transmission elements, in proportion to the speed of the transmission input do not change substantially during the torque phase, although there may be some slip across the off-going clutch. If the on-coming clutch is engaged too slowly relative to the release of the off-going clutch, an engine flare occurs in which the speed ratio increases. If the on-coming clutch is engaged too rapidly, on the other hand, a tie-up condition occurs in which the output torque decreases excessively. To avoid either engine flare or tie-up, the controller may control the off-going clutch to maintain a slight slip speed using feedback control based on a measured transmission speed ratio. Measuring the transmission speed ratio requires measuring the speeds of at least two transmission elements, usually the output shaft and the turbine shaft.

Once the off-going clutch is completely released, the torque transfer phase ends and the inertia phase begins. At the beginning of the inertia phase, the on-coming clutch is transmitting torque with a substantial slip speed. During the inertia phase, the slip speed gradually decreases as the transmission speed ratio approaches the upshifted gear ratio. The torque capacity of the on-coming clutch is controlled to approach the upshifted gear ratio at the desired rate. If the torque capacity of the on-coming clutch is too low, the shift takes too long. If the torque capacity is too high, there may be an excessive torque variation as the shift finishes. To avoid torque disturbances, it is especially important to control the speed ratio as it approaches the upshift speed ratio at which point the on-coming clutch transitions from slipping to fully engaged. Accurate measurement of the speed ratio is crucial in order to provide a proper feedback signal to the controller.

Downshifts also have a torque transfer phase and an inertia phase although they occur in the opposite sequence. During the inertia phase of a downshift, the torque capacity of the off-going clutch is reduced and controlled such that the speed ratio increases at the desired rate. Once the speed ratio reaches the downshifted ratio, the on-coming clutch is gradually engaged and the off-going clutch released to change the power flow path.

Although most shifts only have one off-going clutch and one on-coming clutch, some shifts involve multiple off-going clutches and multiple on-coming clutches. To determine the slip speed of each slipping clutch during such as shift, additional speed sensors are required.

Typical automatic transmission shaft speed sensors use a stationary sensor, such as a Hall effect sensor, mounted to the transmission housing in close proximity to the shaft. A toothed wheel with particular magnetic properties may be fixed to the shaft. The sensor generates an electric voltage or an electric current that varies depending on whether a tooth of the wheel is currently adjacent to the sensor or a gap between teeth is currently adjacent to the sensor. This oscillating electrical signal is processed to determine the speed of the shaft. For example, the controller may measure the length of time between the passage of a tooth and the passage of the previous tooth or may count the number of teeth that pass within a specific time interval. A speed sensor is only able to accurately determine a speed if teeth pass the sensor frequently. Therefore, there is a minimum detectable speed. Increasing the number of teeth on the toothed wheel reduces the minimum detectable speed. However, an excessive number of teeth may reduce the ability to measure higher speeds. A simple speed sensor only detects the magnitude of the rotational speed, not the direction. However, addition of a second sensor offset from the first produces a second oscillating signal. The controller can determine the direction of rotation based on the phase difference between the signals.

The gears, shafts, and clutches of an automatic transmission are often packed closely together to reduce the space required. Sometimes, it is difficult to find a location on a shaft to fix a toothed wheel such that the wheel is in close proximity to a sensor. Additionally, the toothed wheel may complicate the assembly sequence or make assembly impossible.

Shafts within a transmission are typically supported by bearings or bushings. The bearings and bushings react radial forces while reducing friction. Some bearings or bushings support a shaft relative to the stationary housing while others may support a shaft relative to another shaft. A bushing reduces friction by providing a low friction coefficient between the surfaces that have relative motion. A bearing, on the other hand, provides a number of rolling elements that separate the shaft from the supporting component while rolling with respect to both the components. Several types of bearings are common in automotive transmissions. Ball bearings, roller bearings, and tapered roller bearings differ based on the shape of the rolling element. Ball bearings and tapered roller bearings react axial forces as well as radial forces. Bearings also differ based on how the rolling elements are retained. In a caged bearing, the rolling elements are spaced apart from one another by a cage. In a full complement bearing, the rolling elements are retained only by the inner and outer races.

For a caged bearing, when the bearing has sufficient preload, the cage rotates at a speed which is a weighted average of the speed of the inner race and the outer race. The weighting factors are proportional to the relative diameters of the inner and outer races. Since these diameters are known, if the speed of the cage is measured and the speed of one of the races is known, then the speed of the other race can easily be calculated. When one of the races is fixed to the housing, the rotational speed of that race is always zero. The other race is fixed to the shaft. In some cases, it is possible to fix a toothed wheel to a bearing cage, or form the teeth integrally into the bearing cage, where it would have been difficult or impossible to fix a toothed wheel directly to the rotating element. A Hall effect sensor, or other proximity sensor can be utilized to determine the speed of the bearing cage from which the speed of the shaft can be inferred.

Figure 2:
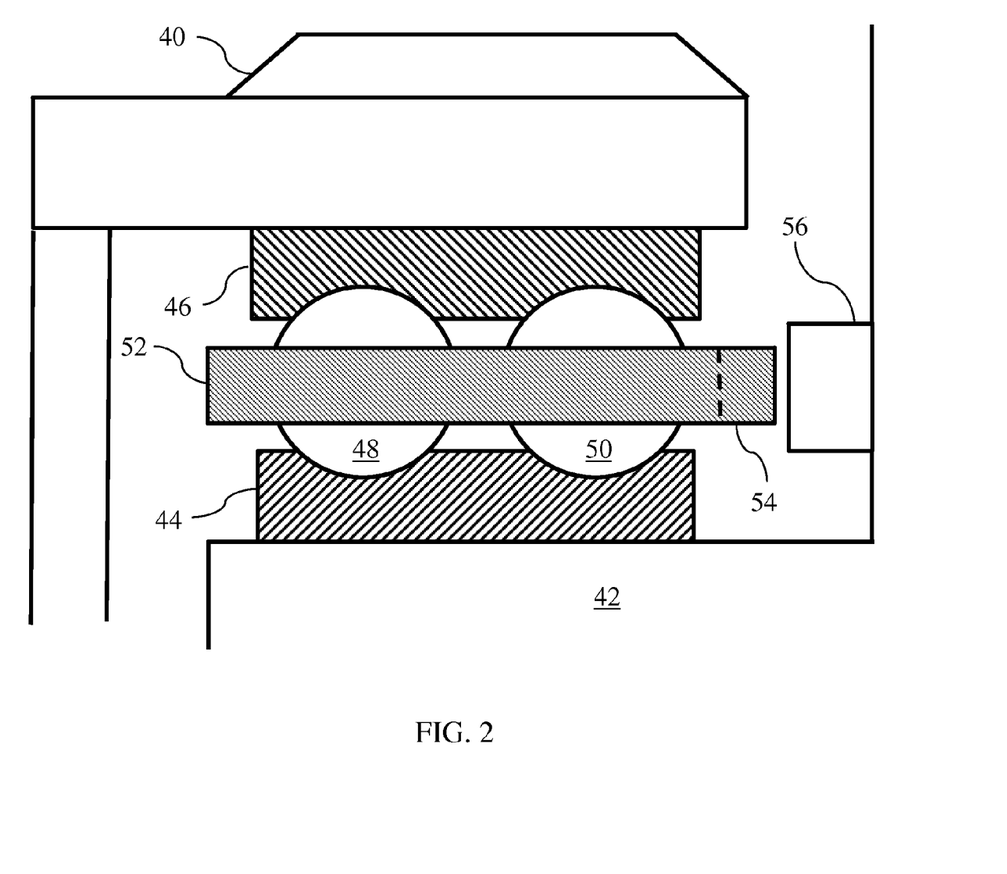
FIG. 2 is a cross section of a double row ball bearing with a proximity based cage speed sensor.

FIG. 2 shows a double row ball bearing supporting a gear 40 with respect to a fixed housing 42. A bearing inner race 44 is fixed to the housing 42 while a bearing outer race 46 is fixed to the gear 40. Balls 48 and 50 roll within grooves in the inner and outer races. The balls are positioned circumferentially with respect to other balls by cage 52. The cage may be stamped, molded, or machined from metal or from a polymer resin. A number of teeth 54 are formed or cut into one edge of the cage. A proximity sensor 56, such as a Hall effect sensor, transmits an electrical signal to controller 28 such that either the voltage or the current varies depending on whether or not a tooth is adjacent to the sensor. If the cage material is a polymer resin or other non-magnetic material, it may be necessary to apply a metallic coating to the teeth. Alternatively, a non-metallic frame may be fixed to a metallic insert defining the teeth by molding or pressing the insert into the frame. Although the stationary housing is shown inside the rotating element in FIG. 2, in other configurations the inner element may rotate and the outer element may be stationary.

Proximity sensors are not the only way of sensing speed based on a bearing. As a rolling element passes over a point on a race, the surface of the race deflects slightly. This slight deflection can be detected by placing an acceleration sensor, load (force) sensor, or acoustic emission sensor close to the race surface. The sensor output will show a pulse as each rolling element passes over. When the sensor is in a fixed race, the cage speed can be determined from the frequency of the pulses and the number of rolling elements in the cage. Specifically, the speed of the cage in revolutions per minute is equal to the frequency in cycles per second divided by the number of rolling elements multiplied by 60. The speed of the shaft can be calculated from the cage speed based on the relative diameters of the inner and outer races as described above. An acceleration sensor, load sensor, or acoustic emission sensor may also be used with full complement bearings.

Figure 3:
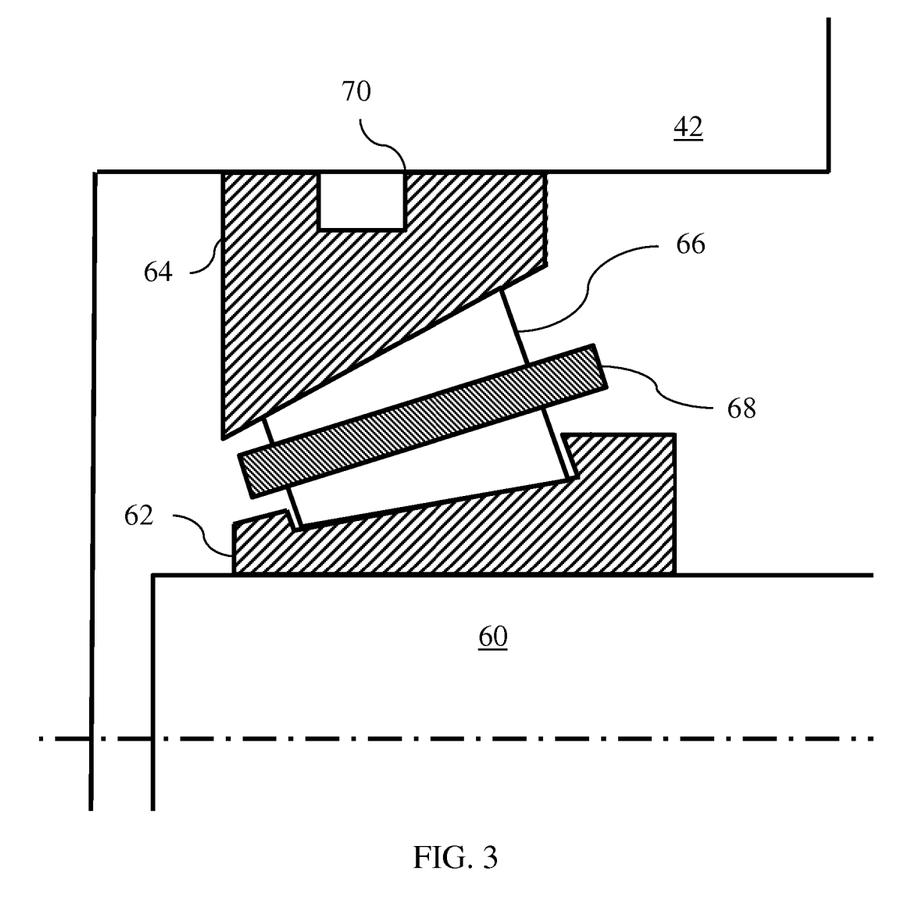
FIG. 3 is a cross section of a tapered roller bearing with an acceleration based cage speed sensor.

FIG. 3 shows a tapered roller bearing supporting a shaft 60 with respect to a fixed housing 42. A bearing inner race 62 is fixed to the shaft 60 while a bearing outer race 64 is fixed to the housing 42. Tapered rollers 66 separate and roll with respect to the inner and outer races. The rollers are positioned circumferentially with respect to one another by cage 68. An acceleration sensor 70, transmits an electrical signal to controller 28 with either a voltage spike or a current spike as each roller passes under the sensor. Although FIGS. 2 and 3 show a proximity sensor with a ball bearing and an acceleration sensor with a tapered roller bearing, either type of sensor may be used with either type of bearing.

Figure 4:
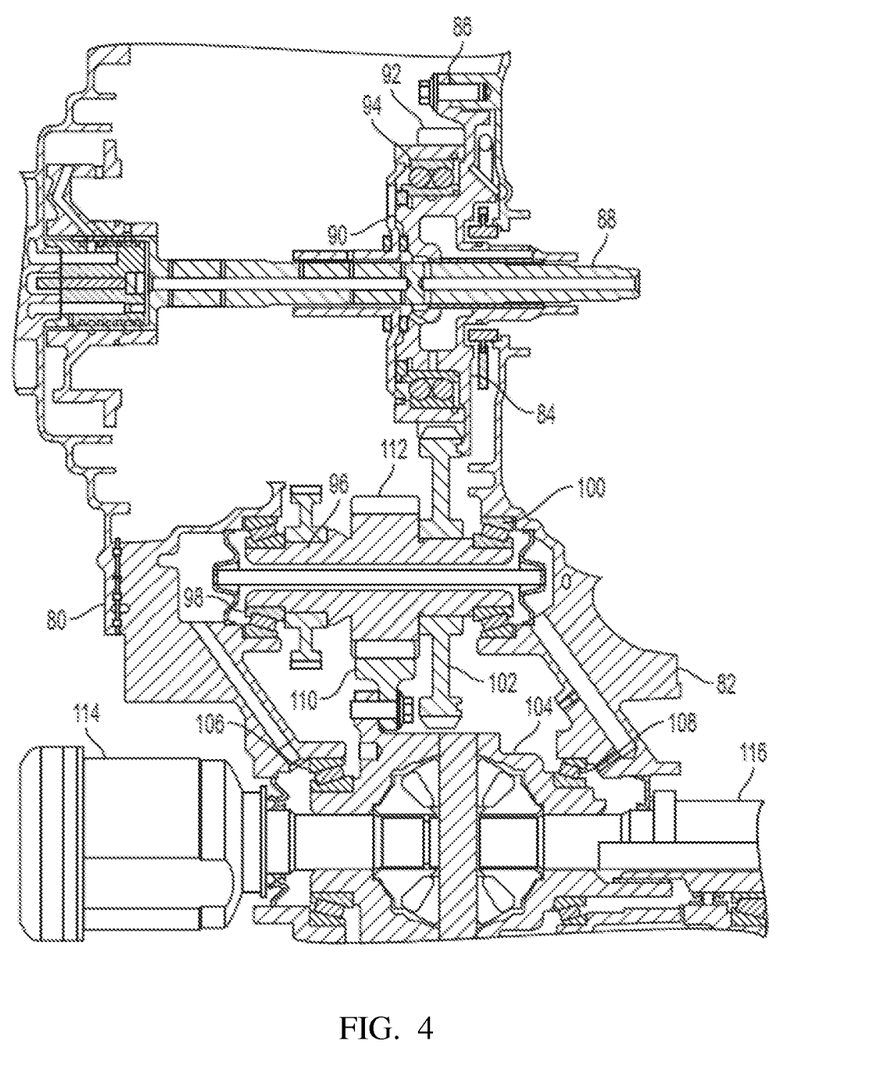
FIG. 4 is a cross section of transaxle potential applications of bearing speed sensors such as those illustrated in FIGS. 2 and 3.

FIG. 4 shows a cross section of a front wheel drive transaxle illustrating several locations that a bearing speed sensor may be utilized. The fixed elements include the main housing 80, a converter housing 82, and a front support 84. The converter housing 82 is bolted to the main housing 80. The front support is bolted to the converter housing at 86. A turbine shaft 88 is driven by a torque converter (not shown). A gearbox (not shown) transmits power from turbine shaft 88 to output shaft 90 at various speed ratios. Output gear 92 is fixed to output shaft 90 and supported by front support 84 by means of double row ball bearing 94. Bearing 94 could be configured as a speed sensor using either a cage proximity sensor as illustrated in FIG. 2 or an inner race acceleration sensor. Intermediate shaft 96 is supported at one end by main housing 80 via tapered roller bearing 98 and at the opposite end by converter housing 82 via tapered roller bearing 100. Intermediate shaft 96 is driven by gear 102 meshing with output gear 92. Bearings 98 or 100 could be configured as a speed sensor using either a cage proximity sensor or an outer race acceleration sensor as illustrated in FIG. 3. Since the speed of intermediate shaft 96 is directly proportional to the speed of output shaft 90, output speed could be calculated from these speed sensors. Differential carrier 104 is supported main housing 80 via tapered roller bearing 106 and by converter housing 82 via tapered roller bearing 108. Carrier 104 is driven by gear 110 meshing with gear 112 which is fixed to intermediate shaft 96. Bearings 106 or 108 could be configured as a speed sensor using either a cage proximity sensor or an outer race acceleration sensor. Axle shaft 114 and 116 are driven by differential carrier 104.

Some types of bearings, particularly tapered roller bearings, require a sufficient axial force, called a pre-load, for proper function. When the pre-load is inadequate, the rolling element may skid with respect to one of the races as opposed to rolling. When this happens, the speed of the cage and the passing frequency of the rolling elements, will not have the predicted relationship to shaft speed. When the transmission is operating in a fixed gear ratio, as opposed to being in the midst of a shift, the ratio of input speed to output speed is known. Therefore, if the measured speed ratio based on a turbine speed sensor and an output speed sensor is not equal to the known speed ratio, and one of the speed sensors is a bearing speed sensor, then improper pre-load on the corresponding bearing should be suspected.

Figure 5:
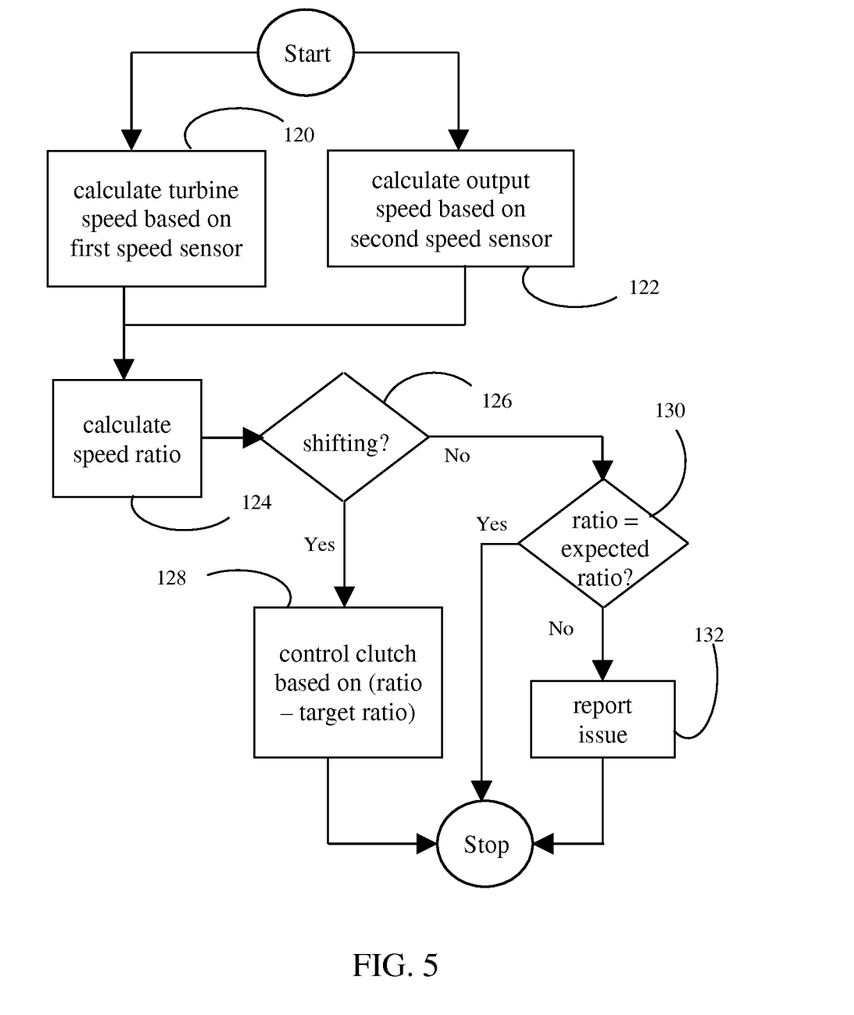
FIG. 5 is a flowchart of a method of controlling a transmission equipped with bearing speed sensors such as the transmission of FIG. 4.

FIG. 5 is a flow chart for a method of controlling a transmission having bearing based speed sensors. At 120 and 122, the turbine speed and output speed are calculated based on readings from the speed sensors. At 124, these speeds are used to calculate the transmission speed ratio. At 126, the method branches based on whether or not the transmission is currently shifting. During a shift, a clutch is controlled in closed loop to achieve a desired speed ratio profile at 128. For example, the on-coming clutch would be controlled during the inertia phase of an upshift and the off-going clutch would be controlled during the inertia phase of a downshift. If the transmission is not currently shifting, the calculated ratio is compared to the expected transmission ratio for the current gear at 130. If the two are not equal, a flag is raised at 132 to trigger further diagnostic measures or failure management features. For example, the controller may conclude that the unexpected reading is attributable to an inadequate pre-load on the bearing.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:
1. A vehicle comprising:
   a housing;
   a shaft;
   a bearing having a plurality of rolling elements separating the shaft from the housing and configured to transmit radial forces from the shaft to the housing and to translate circumferentially as the shaft rotates to facilitate low friction rotation of the shaft with respect to the housing;

a sensor mounted on the housing and configured to transmit a signal that varies in response to translation of a rolling element of the plurality of rolling elements;
a clutch or brake; and
a controller programmed to
 based on the signal from the sensor, calculate an estimated speed of the shaft; and
 adjust a torque capacity of the clutch or brake based on the estimated speed.

2. The vehicle of claim 1 further comprising a cage retaining the rolling elements.

3. The vehicle of claim 2 wherein the sensor is a proximity sensor.

4. The vehicle of claim 3 wherein the cage is formed from a non-metallic material and defines a number of teeth on one edge, the teeth having a metallic coating.

5. The vehicle of claim 3 wherein the cage comprises:
a non-metallic frame; and
one or more metallic inserts defining a number of teeth fixed to an edge of the frame.

6. The vehicle of claim 3 wherein the proximity sensor is a Hall effect sensor.

7. The vehicle of claim 1 wherein the sensor is an acceleration sensor.

8. The vehicle of claim 1 wherein the sensor is a load sensor.

9. The vehicle of claim 1 wherein the sensor is an acoustic emissions sensor.

10. The vehicle of claim 1 wherein the rolling elements are ball bearings.

11. The vehicle of claim 1 wherein the rolling elements are roller bearings.

12. The vehicle of claim 1 wherein the rolling elements are tapered roller bearings.

13. A transmission comprising:
a housing;
a shaft;
a bearing having a plurality of rolling elements separating the shaft from the housing and configured to transmit radial forces from the shaft to the housing and to translate circumferentially as the shaft rotates;
a sensor embedded in a bearing race and configured to transmit a signal in response to a rolling element of the plurality of rolling elements translating past the sensor;
a clutch or brake; and
a controller programmed to
 based on the signal from the sensor, calculate an estimated speed of the shaft; and
 adjust a torque capacity of the clutch or brake based on the estimated speed.

14. The transmission of claim 13 wherein the controller is further programmed to set a flag indicating a possible pre-load issue if the estimated speed differs from an expected shaft speed while the transmission is in a fixed gear ratio.

15. The transmission of claim 13 wherein the sensor is an acceleration sensor.

16. The transmission of claim 13 wherein the sensor is a load sensor.

17. The transmission of claim 13 wherein the sensor is an acoustic emissions sensor.

18. A method of controlling a transmission comprising:
receiving a signal indicating passage of rolling bearing elements past a fixed location on a transmission housing;
based on the signal, calculating an estimated speed of a shaft supported by the rolling bearing elements; and
adjusting a torque capacity of a clutch based on the estimated speed.

19. The method of claim 18 further comprising:
setting a flag indicating a possible pre-load issue if the estimated speed differs from an expected speed while the transmission is in a fixed gear ratio.

* * * * *